US007922182B2

(12) United States Patent  (10) Patent No.: US 7,922,182 B2
Van der Vegt  (45) Date of Patent: Apr. 12, 2011

(54) DEVICE FOR TRANSPORTING A CHILD

(75) Inventor: Herman Van der Vegt, Utrecht (NL)

(73) Assignee: Team-Tex S.A.S. (FR)

( * ) Notice: Subject to any disclaimer, the term of this patent is extended or adjusted under 35 U.S.C. 154(b) by 221 days.

(21) Appl. No.: 12/048,699

(22) Filed: Mar. 14, 2008

(65) Prior Publication Data

US 2008/0224450 A1   Sep. 18, 2008

(30) Foreign Application Priority Data

Mar. 15, 2007   (EP) ..................................... 07104252

(51) Int. Cl.
    *B62B 7/04*   (2006.01)
(52) U.S. Cl. ..................... 280/47.36; 280/47.39; 188/20
(58) Field of Classification Search .................. 280/642, 280/647, 650, 47.38, 47.41; 188/20; 16/35 R
    See application file for complete search history.

(56) References Cited

U.S. PATENT DOCUMENTS

| | | | | |
|---|---|---|---|---|
| 3,890,668 A | * | 6/1975 | Stosberg et al. | 16/35 R |
| 4,116,464 A | * | 9/1978 | Haley | 280/647 |
| 4,567,964 A | * | 2/1986 | Kassai | 188/20 |
| 4,608,729 A | * | 9/1986 | Huang | 16/35 R |
| 4,759,098 A | * | 7/1988 | Ko | 16/29 |
| 4,831,689 A | * | 5/1989 | Lo | 16/35 R |
| 5,215,320 A | * | 6/1993 | Chen | 280/47.36 |
| 5,370,408 A | * | 12/1994 | Eagan | 280/33.994 |
| 5,517,718 A | * | 5/1996 | Eichhorn | 16/35 R |
| 5,713,585 A | * | 2/1998 | Curtis et al. | 280/47.38 |
| 6,298,950 B1 | * | 10/2001 | Oelrichs et al. | 188/20 |
| 6,865,775 B2 | * | 3/2005 | Ganance | 16/35 R |
| 7,059,452 B2 | * | 6/2006 | Chen | 188/20 |
| 7,219,918 B2 | * | 5/2007 | Lan | 280/642 |
| 7,401,803 B1 | * | 7/2008 | Lai | 280/647 |
| 7,614,642 B2 | * | 11/2009 | Dotsey et al. | 280/649 |
| 7,621,003 B2 | * | 11/2009 | Myers et al. | 5/86.1 |
| 2003/0025300 A1 | | 2/2003 | Maxisch | |
| 2006/0175783 A1 | * | 8/2006 | Lan | 280/47.38 |
| 2006/0196736 A1 | * | 9/2006 | Chen | 188/19 |
| 2007/0013169 A1 | * | 1/2007 | Dotsey et al. | 280/642 |
| 2007/0085304 A1 | * | 4/2007 | Yeh | 280/642 |

(Continued)

FOREIGN PATENT DOCUMENTS

EP   0260056 A2   3/1988

(Continued)

OTHER PUBLICATIONS

European Search Report, EP07104252, May 15, 2007, 2 pages.

*Primary Examiner* — Jeffrey J Restifo
(74) *Attorney, Agent, or Firm* — St. Onge Steward Johnston & Reens LLC (57) ABSTRACT

A device for transporting a child in a child seat includes a main frame for supporting the child seat, a swivable push bar for pushing the main frame from different sides, and pivotable wheels or wheel sets for supporting the main frame whereby the wheels or wheel sets are provided with pivot locks and brakes. The push bar has a brake handle for activating the brakes and the device includes a mechanism for activating the pivot locks of the wheels or wheel sets under the push bar and for simultaneously coupling only the brakes on these wheels or wheel sets with the brake handle.

10 Claims, 12 Drawing Sheets

U.S. PATENT DOCUMENTS

| | | | |
|---|---|---|---|
| 2008/0000732 A1* | 1/2008 | Chen et al. | 188/74 |
| 2008/0029982 A1* | 2/2008 | Dotsey et al. | 280/47.38 |
| 2008/0078059 A1* | 4/2008 | Chen et al. | 16/35 R |
| 2008/0093824 A1* | 4/2008 | Chen et al. | 280/642 |
| 2008/0211206 A1* | 9/2008 | Thorne et al. | 280/650 |
| 2008/0224450 A1* | 9/2008 | Van der Vegt | 280/642 |
| 2008/0231023 A1* | 9/2008 | Yang | 280/650 |
| 2009/0033066 A1* | 2/2009 | Saville et al. | 280/650 |
| 2009/0289431 A1* | 11/2009 | Geeslin | 280/47.38 |
| 2009/0295128 A1* | 12/2009 | Nagelski et al. | 280/642 |

FOREIGN PATENT DOCUMENTS

| | | |
|---|---|---|
| FR | 2648102 A1 | 12/1990 |
| WO | 9307039 A1 | 4/1993 |

\* cited by examiner

DEVICE FOR TRANSPORTING A CHILD

CROSS-REFERENCE TO RELATED APPLICATIONS

The present application claims priority from European patent application no. 07104252, filed Mar. 15, 2007, the content of which is incorporated herein by reference.

FIELD OF THE INVENTION

The invention concerns a device for transporting a child in a child seat (1) comprising a main frame (16) for supporting the child seat, a swivable push bar (2) for pushing the main frame from different sides, pivotable wheels or wheel sets (13,15) for supporting the main frame whereby the wheels or wheel sets are provided with pivot locks (69) characterized in that the push bar (2) comprises a brake handle for activating the brakes (88,93) in the wheels or wheel sets (13,15) and that the device comprises a mechanism (32,35,38,40,42,58,61) for activating the pivot locks (69) of the wheels or wheel sets under the push bar and for simultaneously coupling only the brakes on these wheels or wheel sets with the brake handle.

BACKGROUND OF THE INVENTION

Such devices are known, for instance from publication EP 0260056. The disadvantage of the known device is that the wheels have no brakes. From WO 9307039 brakes for each wheel are known but these brakes have to be actuated for each wheel separately which is a disadvantage.

SUMMARY OF THE INVENTION

In order to overcome this disadvantage the device for transporting a child in a child seat (1) comprises a main frame (16) for supporting the child seat, a swivable push bar (2) for pushing the main frame from different sides, pivotable wheels or wheel sets (13,15) for supporting the main frame whereby the wheels or wheel sets are provided with pivot locks (69) characterized in that the push bar (2) comprises a brake handle for activating the brakes (88,93) in the wheels or wheel sets (13,15) and that the device comprises a mechanism (32, 35,38,40,42,58,61) for activating the pivot locks (69) of the wheels or wheel sets under the push bar and for simultaneously coupling only the brakes on these wheels or wheel sets with the brake handle.

In this way the device can be pushed in two directions whereby in each direction the brakes are activated in those wheels for which the pivot locks are activated as well so that when the brakes are activated the pivot locks are activated as well and the wheels or wheel sets are in a stable position relative to the device and can brake properly.

In accordance with an embodiment the device comprises a push bar (2) that is coupled to a push bar axis (21) swivellable in bearings (25) mounted on the main frame (16), which push bar axis has cams (32,38) activating cable pulling means connected to cables (47) which actuate the pivot locks (69). In this way changing the activation of the swivel locks is combined in an easy way with changing the position of the push bar.

In accordance with an embodiment the device comprises a push bar (2) that is coupled with a slide (22) to a push bar axis (21) swivellable in bearings (25) mounted on the main frame, which slide can be positioned along the length of the push bar for changing its longest distance from the push bar axis. In this way the height of the push bar can be adapted to the length of the person using the device.

In accordance with an embodiment the device comprises a push bar (2) that is U-shaped and at both ends connected by the slides (22) to the push bar axis (21). In this way there is a strong and stable connected push bar.

In accordance with an embodiment the device comprises a horizontal axes (83) of the wheels or wheel sets (13,15) that are mounted in a spring arm (77) that can resiliently move relative to the main frame (16) against a spring (82). In this embodiment the device means has springs that reduce the jolts as a result of an uneven pavement and the child transported in the device is more comfortable.

In accordance with an embodiment the device comprises a spring arm (77) that has a brake lever (85) for activating a brake (88,93), which brake lever has a arc shaped cam surface (91) on which a cable activated pin (73) can push for activating the brake. In this embodiment the activation of the brake is independent from the position of the spring arm. This means that the weight of the child or the condition of the pavement has no influence on the braking.

In accordance with an embodiment, the rotation of the wheel (84) can be stopped by moving a brake lever (85) coupled to a brake pin (104) so that the brake pin is pushed between brake notches (88) on the inside of the hub (87) of the wheel and whereby the brake pin can move against a spring (106) in a slot (103) in the brake lever when the brake pin is pushed against a brake notch. In this way activation of the brake does not lead to unacceptable deformations when the brake notch prevents moving of the brake pin.

BRIEF DESCRIPTION OF THE DRAWINGS

The invention is explained below with reference to one or more exemplary embodiments with the aid of a drawing, in which.

DETAILED DESCRIPTION OF THE INVENTION

Figure 1:
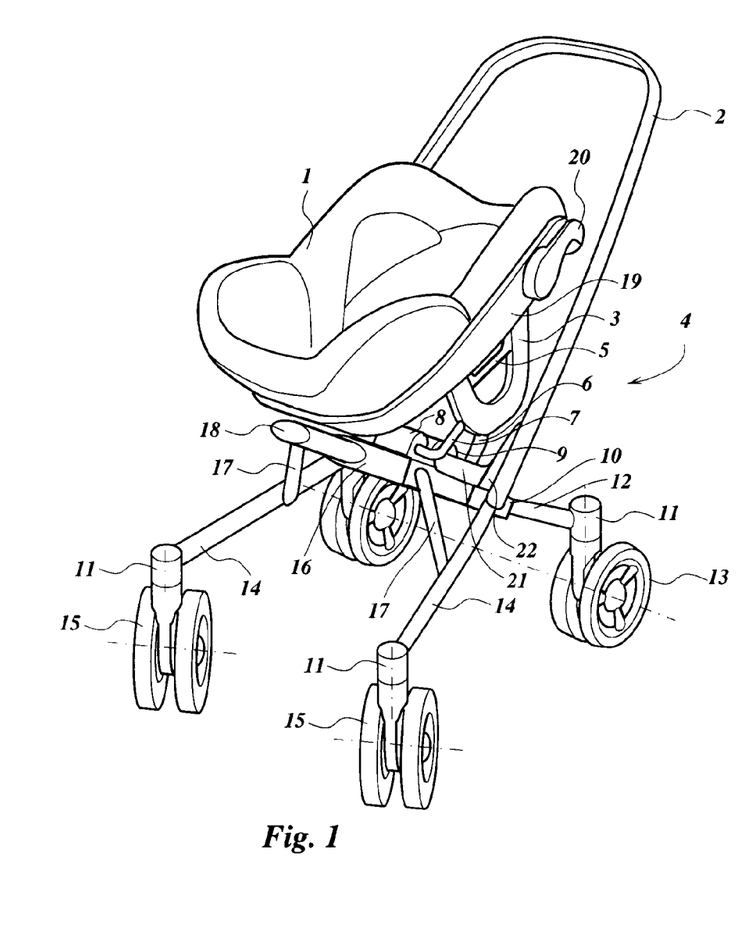
FIG. 1 shows a perspective view of a stroller with a child seat.

FIG. 1 shows a child seat 1 mounted on a stroller 4. The child seat 1 has a seat frame 19, which encompasses the child seat 1. A carrying handle 20 for carrying the child seat 1 is fastened to the seat frame 19 and can be used for lifting the child seat 1 off the stroller 4. The stroller 4 has a support bracket 3, which connects to the seat frame 19. The support bracket 3 is connected with a lower support bar 6 via a lower support bearing 9 to a lower frame 10 and also with an upper support bar 7 via an upper support bearing 8 to an upper frame 16. The C-shaped support bracket 3 is reinforced at its open end with a bar 5. In FIG. 1 the shown child seat 1 is an infant carrier type, suitable for very young children. The C-shaped support bracket 3 has a design that is also suitable for connecting to other child seat types, such as a conventional stroller seat for older children and/or a carry cot type for new born children. In this way the stroller 4 is suitable for use with children of different age groups.

The upper frame 16 and the lower frame 10 are coupled by a rail 18, which is fastened in the lower frame 10 and which can slide in the upper frame 16. This relative movement of the upper frame 16 and the lower frame 10 arranges that the stroller 4 can fold to a smaller size when not in use. For this reason the first wheel arms 12 can slide through an opening in the lower frame 10 and are connected with their ends to the upper frame 16 and the second wheel arms 14 are coupled with their ends to the lower frame 10 and are coupled with a connecting bar 17 to the upper frame 16. When folded out in the position of use of the stroller 4 the first wheel arms 12 have at their lower ends a wheel pivot 11 with a first wheel set 13, whereby the wheel pivot 11 has a vertical pivot axis so that the wheel set 13 can pivot around this axis. In that position the second wheel arms 14 have at their lower ends wheel pivots 11 in the same position so that a second wheel set 15 can pivot around the vertical pivot axis.

For pushing the stroller 4 there is a push bar 2 fastened on the upper frame 16. In the position shown in FIG. 1, the push bar 2 is behind the head of the child in the child seat 1 and the child is facing forward in the same direction as the direction of travel of the stroller 4. At each end of its U shaped legs the push bar 2 has a push bar slide 22, which push bar slides 22 are connected by a push bar axis 21. The push bar axis 21 can rotate in push bar bearings 25 (see FIGS. 3-6) which is fastened on the upper frame 16. The wheel pivots 11 are designed such that the pivot movements of the wheel sets 13,15 can be locked so that for the two wheel sets that are located on the side of the push bar 2, hereafter described as underneath the push bar 2, have a common rotation axis c which is perpendicular to the general direction of travel. In FIG. 1 the wheels of the first wheel sets 13, which are nearest to the person pushing the stroller 4, rotate around a common rotation axis c and cannot pivot and the second wheel sets 15 are free to pivot in the wheel pivots 11. This makes maneuvering the stroller easier.

Figure 2:
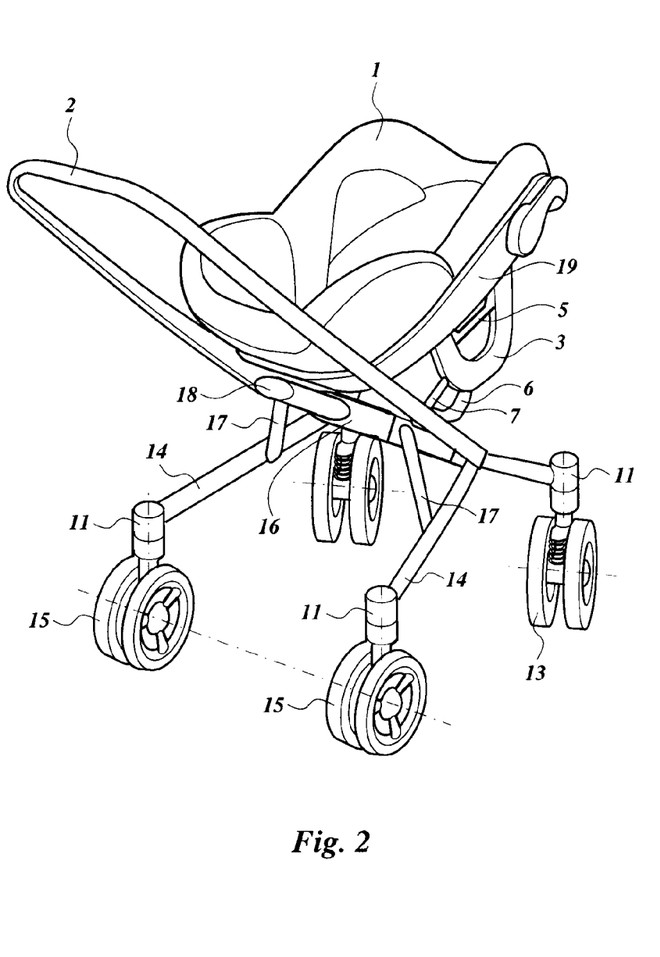
FIG. 2 shows a perspective view of the stroller of FIG. 1 adapted for pushing the stroller in the opposite direction.

FIG. 2 shows the stroller 4 of FIG. 1, whereby the push bar axis 22 has been rotated in the push bar bearing 25 to the other side of the stroller 4. In this position, the child looks to the person pushing the stroller 4, and the first wheel sets 13 are now free to pivot while the wheels of the second wheel sets 15, which are under the push bar 2, are in a locked pivot position with a common rotation axis c.

Figure 3:
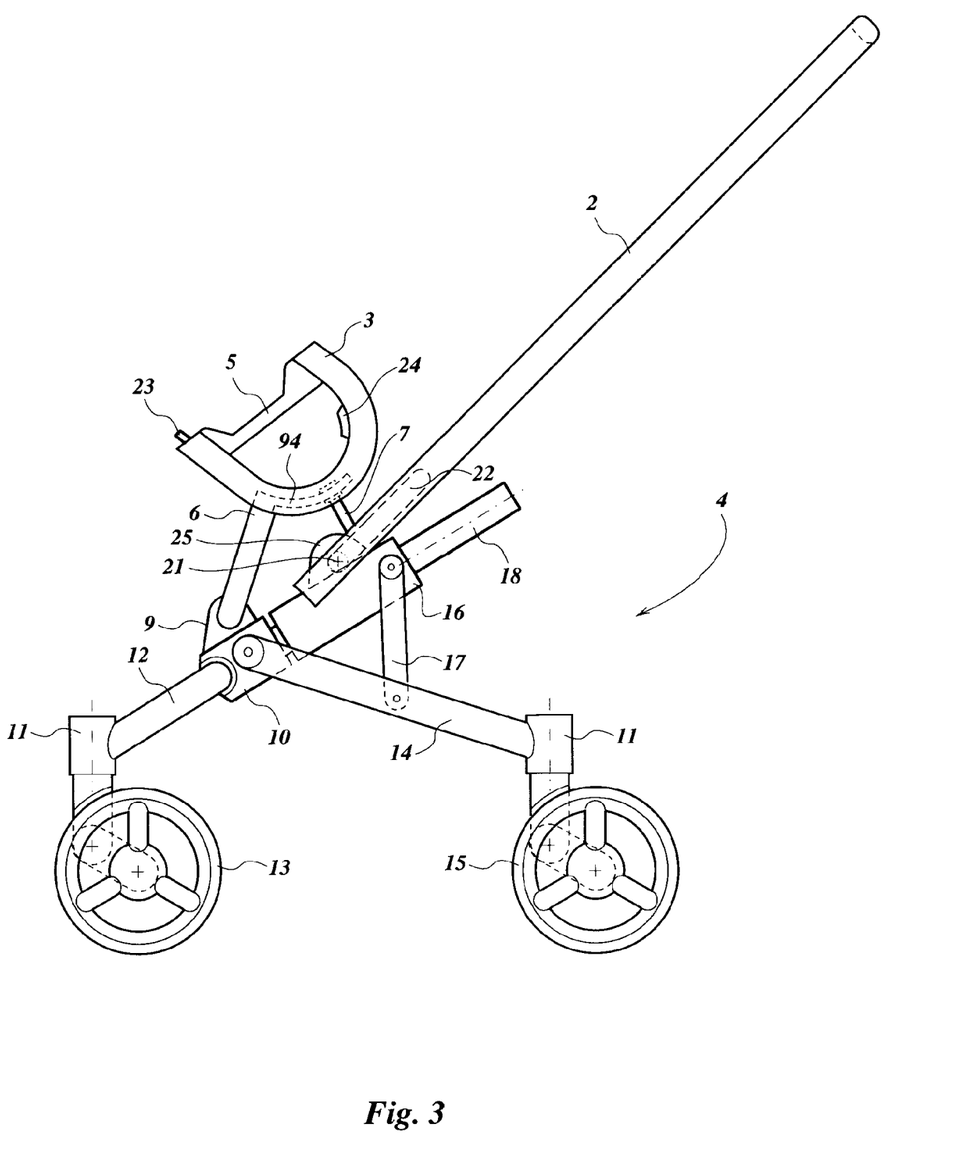
FIG. 3 shows the stroller of FIG. 1 in side view without child seat.

FIG. 3 shows the stroller 4 with the push bar 2 in the position as shown in FIG. 1, whereby the push bar 2 makes an angle of approximately 10 to 15 degrees with the plane of the upper frame 16 and lower frame 10. In FIG. 3 the stroller 4 is shown without child seat 1. It is schematically shown that for positioning the child seat 1 the support bracket 3 has a positioning pin 23. For coupling the child seat 1 to the stroller 4 there is a strong construction, which is not shown here. Interrupted lines show a first slide 94 connected to the lower support bar 6, the position of the first slide 94 is lockable in the support bracket 3 and can be changed by activating the release button 24.

The upper support bar 7 is coupled in the support bracket 3 to the first slide 94 by a second slide movable relative to the first slide 94, the position of the second slide is determined by the distance between the upper support bearing 8 and the lower support bearing 9 and thereby changes during folding of the stroller 4. The slides in the support bracket 3 create a stable connection between the support bracket 3 and the stroller 4 so that there is a stable coupling between the child seat 1 and the stroller 4. In a different embodiment the upper support bar 7 is directly coupled to the first slide 94 by a pivot (not shown).

Figure 4:
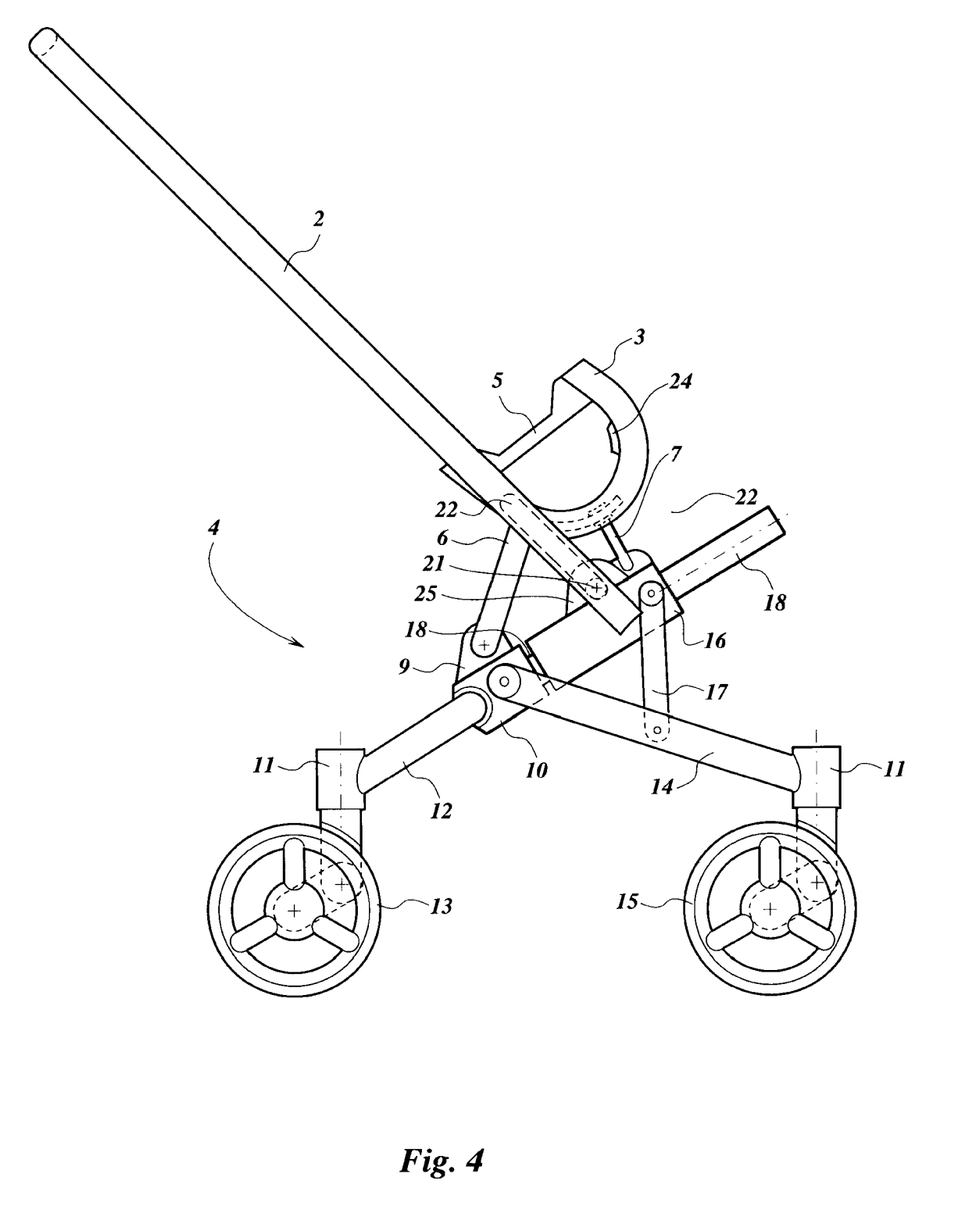
FIG. 4 shows the stroller of FIG. 2 in side view without child seat.

FIG. 4 shows the stroller 4 with the push bar 2 in the position as shown in FIG. 2, whereby the push bar 2 is rotated a further 85-90 degrees in the push bar bearing 25. This further rotation of the push bar axis 21 changes the settings of the wheel pivots 11 so that the pivoting of the wheel sets 13 under the push bar 2 is locked and the wheels will have a common rotation axis c. The forward wheel sets 15 can pivot freely.

Figure 5:
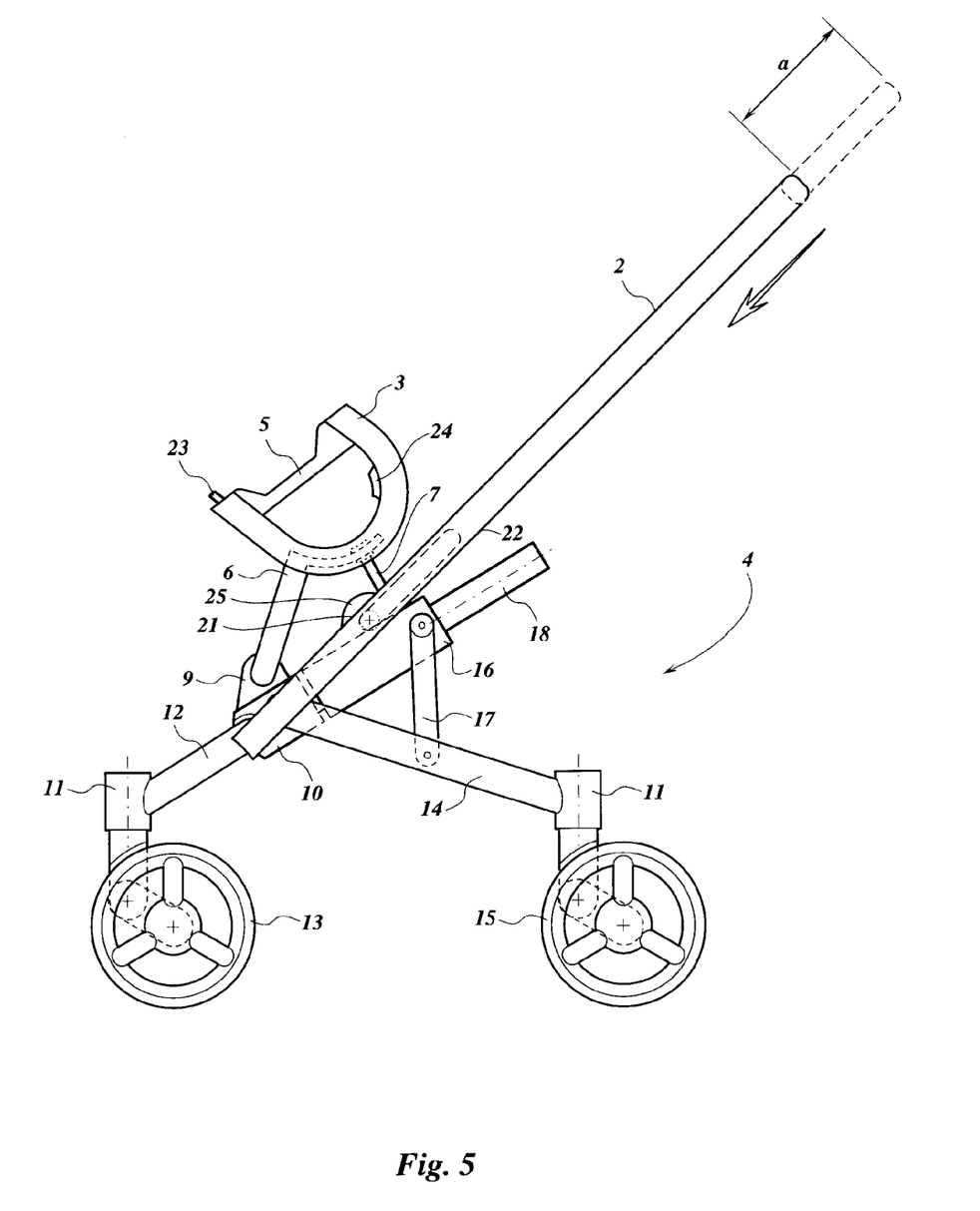
FIG. 5 shows the stroller of FIG. 1 in side view without child seat and with reduced height of a push bar.

FIG. 5 shows the stroller 4 as shown in FIG. 3 with a reduced height of the push bar 2. This is achieved by releasing the movement of the push bar slide 22 with a height setting release button on the push bar 2 (not shown). The push bar slide 22 can slide over a distance a along the push bar 2, whereby the distance a can be approximately 200 mm. In this way, the height of the push bar 2 can be adapted to the height of the person pushing the stroller 4.

Figure 6A:
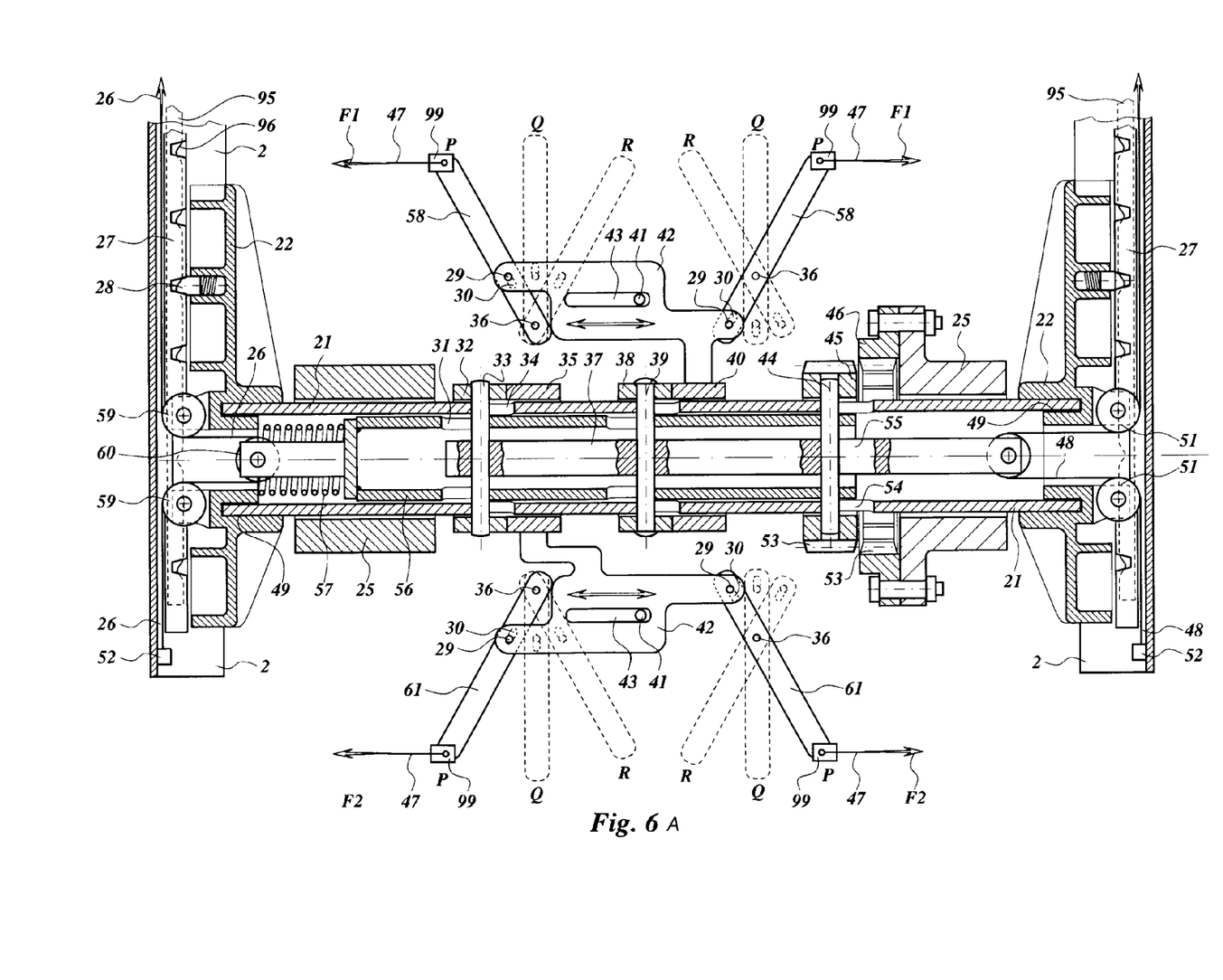
FIG. 6a shows a schematic section of a first embodiment of a push bar rotation axis and a mechanism activated by the push bar rotation axis for controlling the wheel pivots.

FIG. 6a shows in a schematic section the mechanism used for changing the settings of the wheel pivots 11 by rotating the push bar axis 21 and the connection of the push bar axis 21 to the push bar 2. The push bar axis 21 is a hollow pipe 21, which can rotate in the two push bar bearings 25. The hollow pipe 21 is inserted in a groove 49 of the push bar slides 22 are fastened thereto in a fixed position in a known way. The push bar slide 22 can slide over the distance a that can be 200-250 mm along the push bar 2. The push bar 2 shown in FIG. 6 is shown to have a partly open profile in which the push bar slide 22 can be positioned.

For positioning the push bar slide 22 relative to the push bar 2 a notched plate 27 of this distance is mounted on the push bar 2 and a spring loaded catch 28 mounted in the push bar slide 22 can click in openings of the notched plate 27. In the push bar the height setting release button pushes in each push bar slide 22 a release bar 95 downwards. The release bar 95 is provided with wedges 96 for pushing the catches 28 out of the openings in the notched plate 22, so that the push bar slide 22 can slide in the push bar 2 till the catch 28 clicks in the next opening.

Near one of the push bar bearings 25 a pin 44 rotationally positions a toothed ring 45 on the outside of the push bar axis 21. The hollow pipe 21 has two slots 54 for positioning the pin 44 so that the toothed ring 45, with teeth 53 on its outside circumference, can move in axial direction along the push bar axis 21 and rotates with this axis 21. A positioning ring 46, with teeth 53 on its inside circumference, is fastened to the push bar bearing 25. The teeth 53 on the toothed ring 45 and the positioning ring 46 make it possible that in at least two positions the toothed ring 45 can slide inside the positioning ring 46 for blocking the rotation of the push bar axis 21. These blocked positions of the rotation of the push bar axis 21 coincide with the positions of the push bar 2 as indicated in the FIGS. 1 and 3 and 2 and 4.

In an embodiment that is not shown here there is a further lever that is activated by the axial movement of the toothed ring 45. This lever unlocks the axial movement of the rail 18 in the upper frame 16 so that the movement of the rail 18 is locked when the toothed ring 45 is positioned inside the positioning ring 46 and the stroller 4 is ready for use and the stroller 4 can be folded when the toothed ring 45 is outside the positioning ring 46 and the push bar 2 is free to rotate.

The pin 44 is fixed in and moves in axial direction with a swivel release sleeve 56, which is mounted inside the hollow pipe of the push bar axis 21. A spring 57 between the swivel release sleeve 56 and the push bar slide 22 pushes the toothed ring 45 in the positioning ring 46 when the push bar axis 21 is in the right rotational position. A swivel release cable 26 can pull the toothed ring 45 out of the positioning ring 46. The swivel release cable 26 is activated by a swivel release handle (not shown) mounted on the push bar 2, and is guided along the sheaves 59 on the push bar slide 22 and sheave 60 on the swivel release sleeve 56 and its end is fastened on the push bar 2 with a clamp 52. By guiding the swivel release cable 26 in this way the push bar slide 22 can move along the push bar 2 without influencing the position of the swivel release sleeve 56.

For locking the wheel pivots 11 of the first wheel sets 13 the wheel pivots 11 of the wheel sets 13 are connected with levers 61 by a cable 47, which is part of a Bowden cable between the upper frame 16 and a wheel pivot 11. For locking the wheel pivots of the second wheel sets 15 the wheel pivots 11 are connected by cables 47 with levers 58. The position of the levers 58 and 61 determines whether the wheel pivot 11 is locked or free and whether a brake is applied to the wheels or not. When the lever 58 or 61 is in position P the wheel pivot 11 can rotate and there is no brake applied to the wheels. With the lever 58 or 61 in position Q the wheel pivot 11 will lock in a fixed position and the brake is not applied to the wheels either. With the lever 58 or 61 in position R the wheel pivot 11 will lock in a fixed position and the brake will be applied to the wheels. In the wheel pivots 11 the cables 47 that are connected to the first wheel sets 13 are subjected to a pulling force F1 and in the wheel pivots 11 the cables 47 that are connected to the second wheel sets 15 are subjected to a pulling force F2. It has been found that it is sufficient for keeping the stroller 4 located at one position to brake only those two wheel sets that have locked wheel pivots 11.

The levers 58 and 61 rotate around a pivot pin 36 and are moved by a pin 29 which is fixed in a lever actuating slide 42. For coupling the movement of the levers 58 and 61 with the movement of the lever actuating slide 42 the levers 58 and 61 are provided with a slotted hole 30. For guiding the lever actuating slide 42 it is provided with a slot 43 which can move along a guide pin 41.

The lever actuating slide 42 that positions the levers 58 is connected to a fourth cam ring 40. This fourth cam ring 40 is pushed by the pulling force F2 in axial direction against a third cam ring 38 and can be moved by it. The rotation of the third cam ring 38 is coupled to the rotation of the push bar axis 21 by a pin 39. The pin 39 can move in axial direction in the slots 31 and 34 and is fixed in a wheel braking bar 37. The surface between the third cam ring 38 and the fourth cam ring 40 is profiled as indicated in FIG. 7. As the rotation of the push bar axis 21 and the third cam ring 38 are coupled and the fourth cam ring 40 does not rotate this rotation creates an axial movement positioning the levers 58 in the positions P and Q. For bringing the levers 58 in the position R, where by the wheels of the second wheel set 15 are braked, a brake handle on the push bar 2 (not shown) is activated whereby the brake cable 48 is pulled. The brake cable 48 is guided along sheaves 51, which are mounted in the push bar slide 22, and a sheave 50, which is mounted on the wheel braking bar 37 and the end of the brake cable 48 is fastened to the push bar 2 by a clamp 52. By pulling the brake cable 48 the wheel braking bar 37 pushes the third cam ring 38 and the fourth cam ring 40 to the right so that the levers 58 are brought in position R. In order that the axial movement of the wheel braking bar 37 is not hindered by the pin 44, this pin is guided through a slot 55. By limiting the length of the slot 55 braking can be prevented in situations when the push bar 2 is free to rotate.

For actuating the levers 61 the lever actuating slide 42 coupled to the levers 61 is coupled to a second cam ring 35 which is pulled by the pulling force F1 in axial direction against a first cam ring 32 which is connected in the same way as previous described for the third cam ring 38 by a pin 33 to the wheel braking bar 37 and rotated by the push bar axis 21. When the push bar axis 21 rotates, the first cam ring 32 moves the second cam ring 35 in axial direction and so adjusts the setting of the lever 61. The wheel braking bar 37 activates the braking of the first wheel sets 13 in the same way as described above for the second wheel sets 15.

Figure 6B:
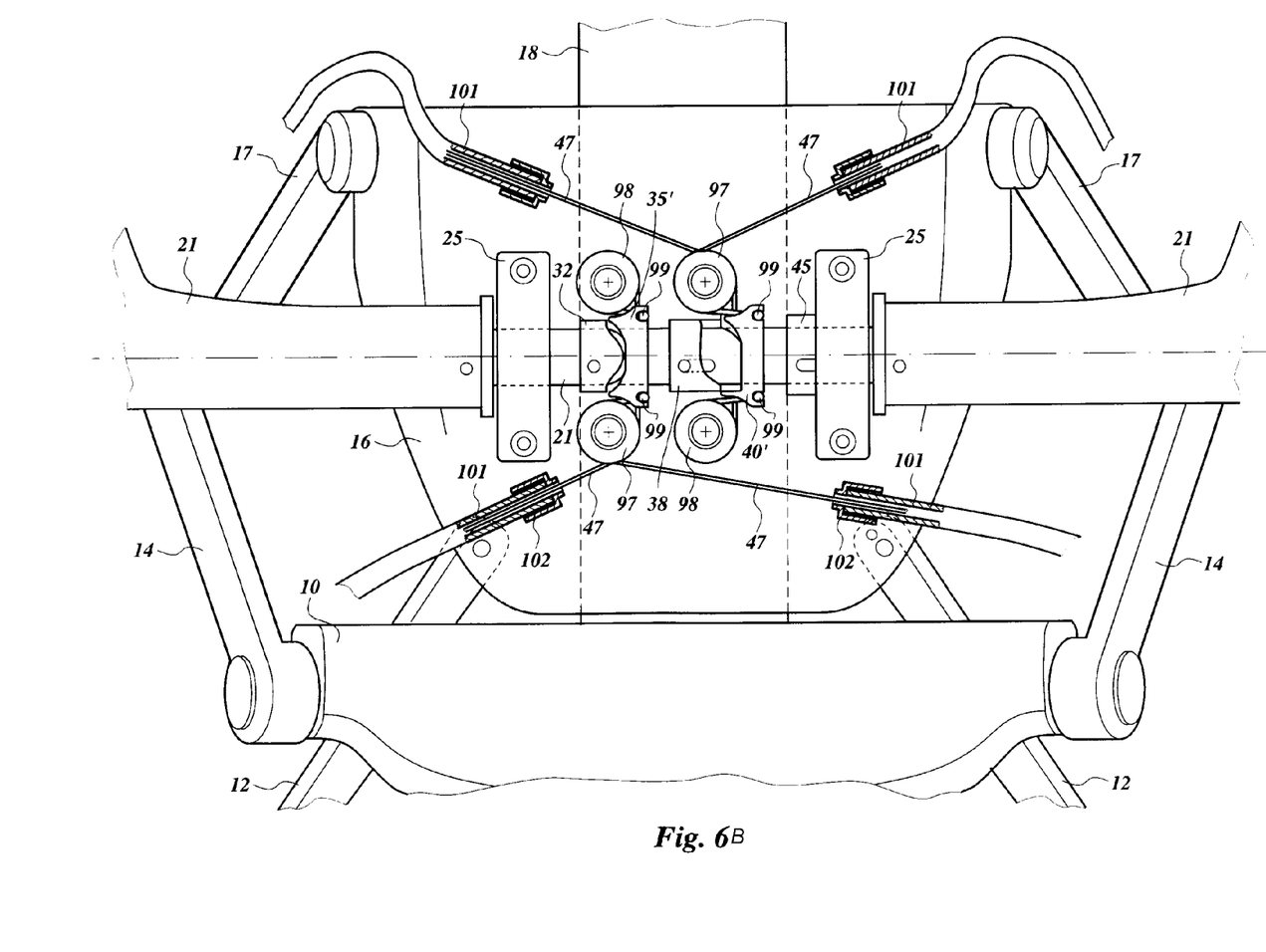
FIG. 6b shows a top view of a second embodiment of the push bar rotation axis and the mechanism for controlling wheel pivots.

FIG. 6b shows a top view of a second embodiment of the mechanism used for changing the settings of the wheel pivots 11 by rotating the push bar axis 21. In this embodiment the cables 47 are directly connected with their cable ends 99 to the second cam ring 35' and the fourth cam ring 40', thereby avoiding backlash and resistance in the various levers. The load on the cam rings 35', 40' is equally divided over the circumference which improves the contact between the first cam ring 32 and the second cam ring 35' and respectively the third cam ring 38 and the fourth cam ring 40' and improves their movements in longitudinal direction along the push bar axis 21. For guiding the cables 47 to either both first wheel sets or both second wheel sets both cables 47 are guided around a first capstan 97, after passing the capstan 97 one of the cables is connected to the cam ring 35' or 40' and the other is looped around a second capstan 98 and then connected to the cam ring 35' or 40'. The Bowden cables have cable shields 101 that end in a cable shield stop 102. The cable shield stops 102 are fastened in a known way on the upper frame 16. In the embodiment shown the four cables 47 pull the cam rings 35', 40' in the same direction so pushing the push bar axis 21 in a stable position. In a further embodiment, the cables 47 could have opposite directions so reducing the axial load on the push bar axis 21.

Figure 6C:
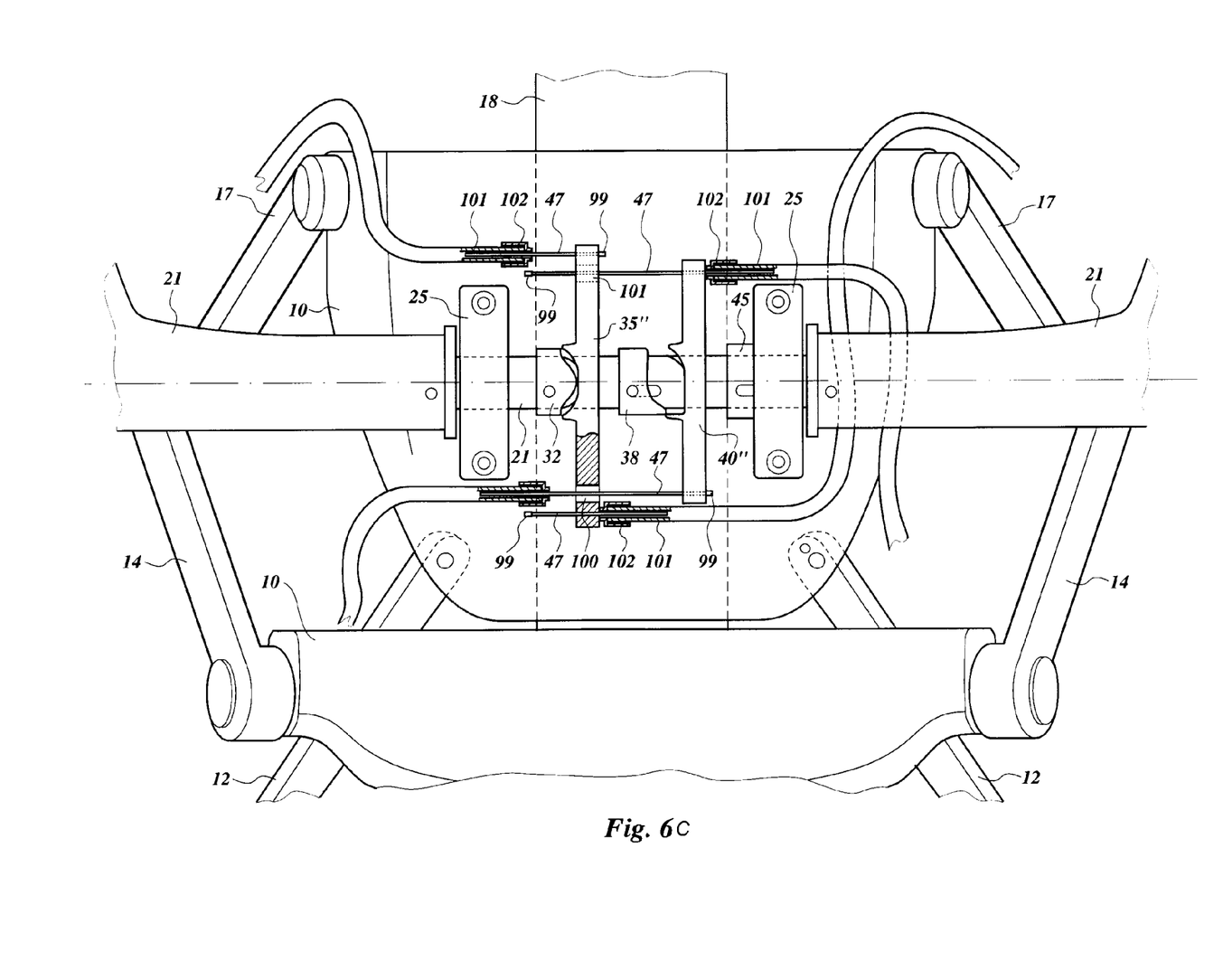
FIG. 6c shows a top view of a third embodiment of the push bar rotation axis and the mechanism for controlling wheel pivots.

FIG. 6c shows a top view of a third embodiment of the mechanism used for changing the settings of the wheel pivots 11 by rotating the push bar axis 21. In this embodiment, a second cam ring 35" is directly coupled to the cable end 99 and/or the cable shield stop 102 of both Bowden cables to the second wheel sets 15. A fourth cam ring 40" is also directly coupled to the cable end 99 and/or the cable shield stop 102 of both Bowden cables to the first wheel sets 13. In this embodiment, the cables 47 follow a straight line from the cable shield stops 102 to the cable end 99 and if required are guided through an opening 100 in either the second cam ring 35" or the fourth cam ring 40".

Figure 7A:
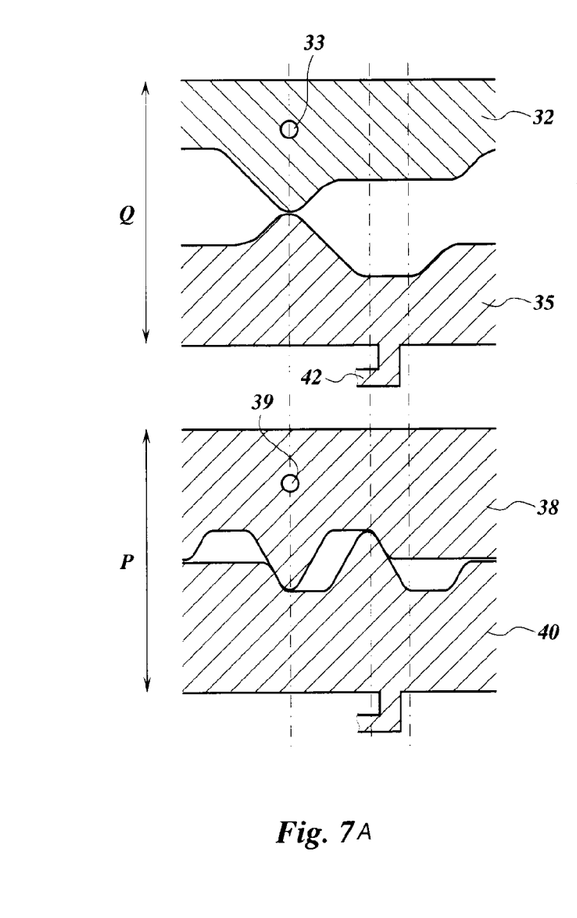
FIGS. 7a-c show a rendering of cam surfaces used in the mechanism shown in FIG. 6, FIGS. 8a-c show schematic sections of a part of a wheel pivot under three control conditions.
Figure 7B:
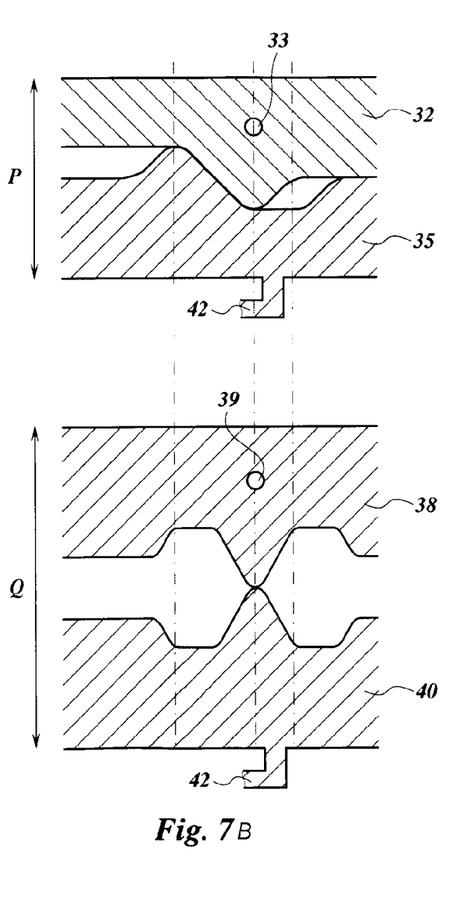
Figure 7C:
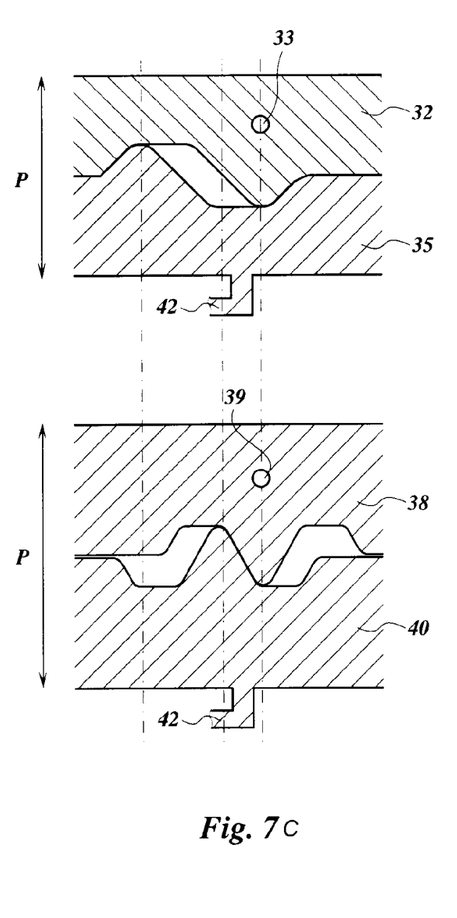

FIG. 7 shows a rendering of the cam surfaces and the interaction between the first cam ring 32 and the second cam ring 35 (or 35' and 35" respectively) and respectively the third cam ring 38 and the fourth cam ring 40 (or 40' and 40" respectively) as a result of the rotation of the push bar axis 21 which is illustrated by the differing positions of the pins 33 and 39. FIG. 7a shows the situation of FIG. 1 whereby only the wheel pivots 11 of the first wheel sets 13 are locked, FIG. 7b shows the situation of FIG. 2 whereby only the wheel pivots 11 of the second wheel sets 15 are locked and FIG. 7c shows the situation whereby all wheel pivots 11 are free to rotate for instance in a situation during folding of the stroller 4.

Figure 8A:
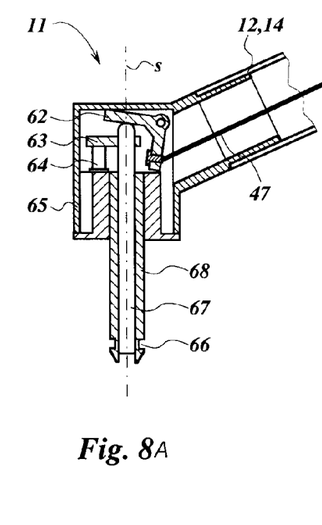
Figures 8B, 8C:
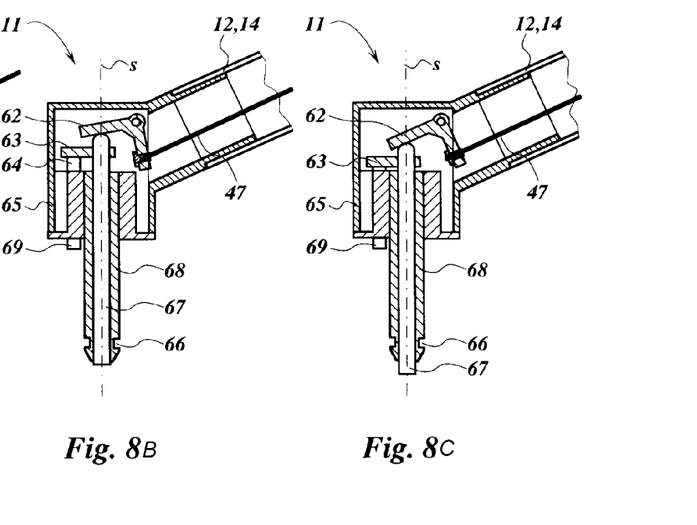

FIG. 8 shows an upper pivot housing 65 of the wheel pivot 11, whereby FIG. 8a shows the situation when the lever 58 or 61 connected to the wheel pivot 11 is in the position P whereby the wheel pivot 11 can pivot freely. FIG. 8b shows the situation whereby the lever 58,61 is in the position Q whereby the pivoting is locked and FIG. 8c shows the situation whereby the lever 58,61 is in the position R and the pivoting is locked and the wheel is braked. The cable 47 is attached to a control lever 62 which pushes on a control rod 67 that is movable in axial direction in a pivot axis 68. The control rod 67 extends below the pivot axis 68 in the situation whereby the wheels must be braked. The outside of the pivot axis 68 has a groove 66 for positioning the pivot axis 68 in a lower pivot housing 76, see FIG. 9. A brace 63 is connected to and moves with the control rod 67. A pin 64 is connected to the brace 63 and the pin 64 actuates a pivot lock 69.

Figure 9:
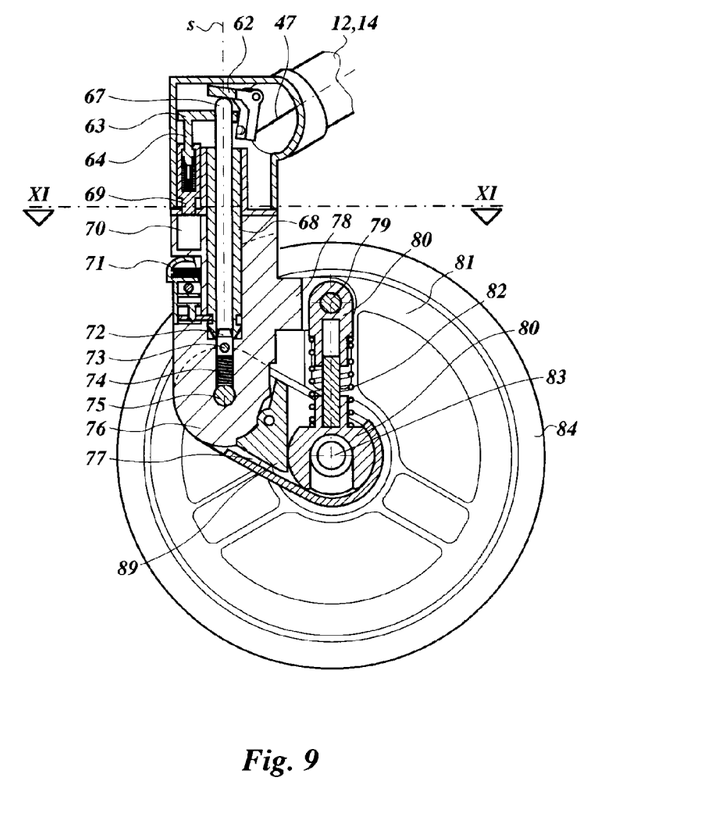
FIG. 9 shows a schematic section of a wheel pivot with wheel.
Figure 10A:
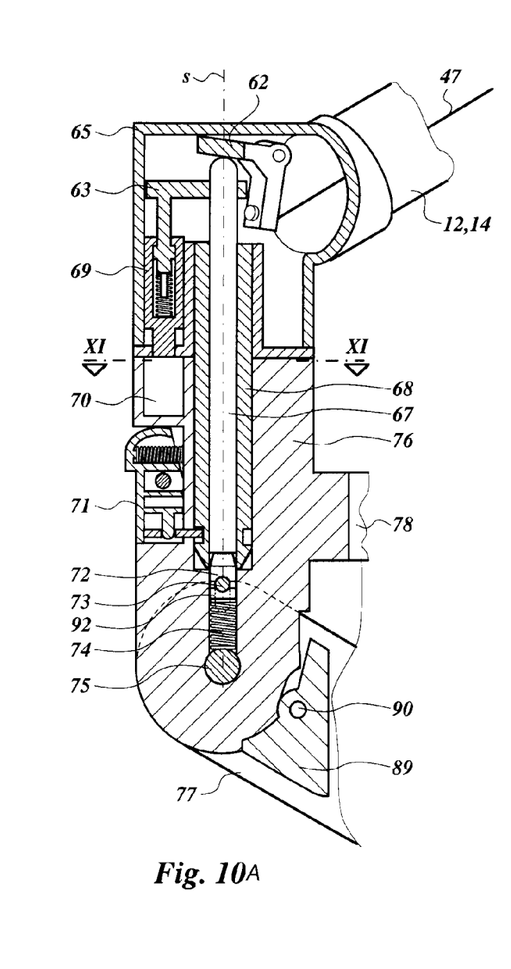
FIGS. 10a-c show schematic sections of the wheel pivot as shown in FIG. 9 under three control conditions.
Figure 10B:
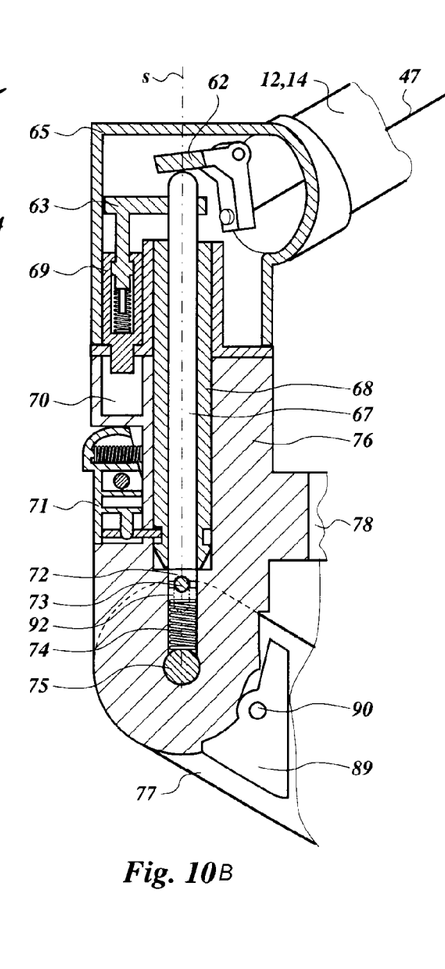
Figure 10C:
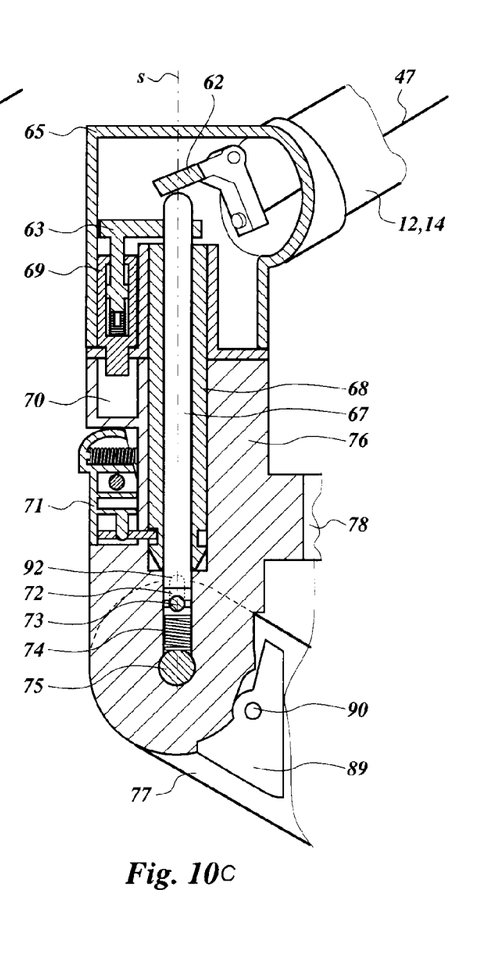

FIG. 9 shows a wheel pivot 11 together with a wheel 84 of the wheel set 13,15. FIGS. 10a, 10b and 10c show the wheel pivot 11 in more detail respectively in the positions P, Q and R of the cable 47, the control lever 62 and the control rod 67. The lower pivot housing 76 can rotate around the pivot axis 68. A lock is clicked in the groove 66 of the pivot axis 68 to fixate the pivot axis 68 in the lower pivot housing 76. For removing the wheel set 13,15 from the wheel pivot 11 a wheel remove button 71 can be pushed so that the lock is free from the groove 66.

The lower pivot housing 76 has a socket 70 in which the pivot lock 69 can be inserted. If the pivot lock 69 extends into the socket 70, rotation of the lower pivot housing 76 relative to the upper pivot housing 65 is locked. As the control rod 67 and the brace 63 with pin 64 can be lowered by the cable 47 while the socket 70 is not under the pivot lock 69 the pin 64 and the pivot lock 69 are coupled in such a way that their total length can be reduced under a spring load. With a lowered pin 64 as soon as the pivot lock 69 is above the socket 70 this spring load pushes the pivot lock 69 into the socket 70. The pivot lock 69 and the pin 64 are coupled in such a way that when the pin 64 moves upwards with the control rod 67 it pulls the pivot lock 69 upwards out of the socket 70.

In the lower pivot housing 76 immediately under the control rod 69 there is a slide piece 72 which is pressed by a spring 74 against the control rod 67 and which slide piece 72 follows the axial movement of the control rod 67. The spring 74 causes the tension in the cable 47. Perpendicular to the pivot axis 68 there is a swivel axis 75 that connects the lower pivot housing 76 to a swivel arm 77. The swivel arm 77 holds a wheel axis 83 on which a hub 87 is mounted, which hub 87 is connected to a wheel rim 81 around which there is a tire. At the side of the lower pivot housing 76 there is a spring bracket 78. Between an axis 79 through the spring bracket 78 and the wheel axis 83 a spring holder 80 with a spring 82 is mounted. This spring 82 absorbs the bumpiness in a pavement on which the stroller 4 rides. For limiting the stroke of the spring 82 the rotation of the swivel arm 77 is limited by a toggle 89 which can rotate around a pin 90 and which toggle 89 interacts with the lower pivot. housing 76. For detecting axial movement of the slide piece 72 the slide piece 72 is coupled to a brake control rod 73 which controls the movement of a brake lever 85 (see FIGS. 11 and 12) and which is movable in a slot 92.

Figure 11:
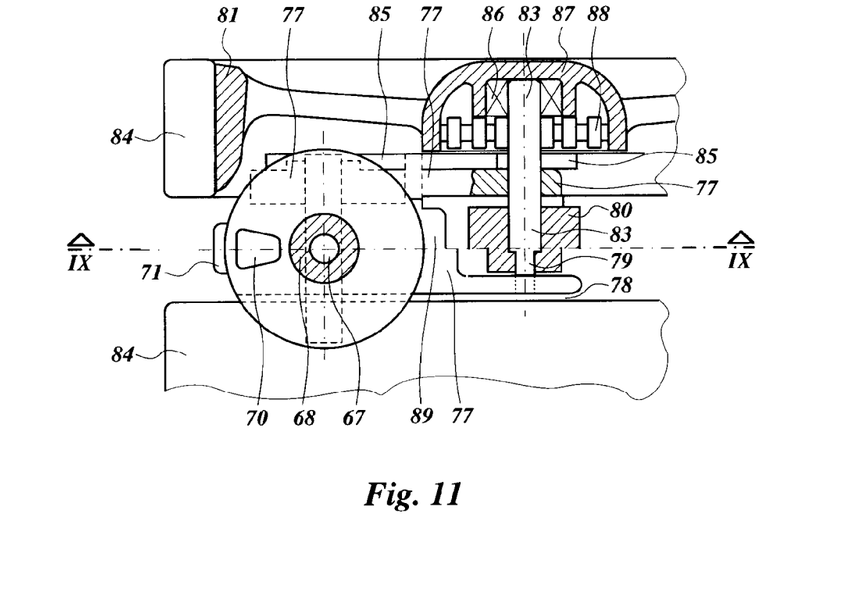
FIG. 11 shows a top view of the lower part of the wheel pivot and partly a section of the wheel.

FIG. 11 shows a top view of the lower pivot housing 76 and partly a section of the wheel with the hub 87. The hub 87 rotates using a bearing 86 around the wheel axis 83, whereby the wheel axis 83 is fastened in the swivel arm 77. The brake levers 85 are mounted on both sides of the swivel arm 77 near the wheel hubs 87 and can rotate around the pin 90. On the inside circumference of the hub 87 there are brake notches 88 that can interact with a resilient brake nib 93 (see FIG. 12) for stopping the rotation of a wheel. The brake nib 93 is elastic and made of for instance rubber, so that no damage occurs when the brake lever 85 pushes the brake nib 93 on a brake notch 88 instead of between two brake notches 88.

Figure 12A:
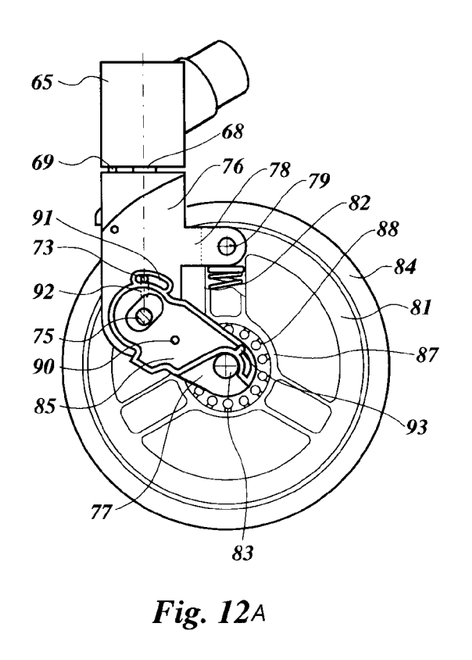
FIGS. 12a-b show side views of the wheel pivot with wheel.
Figure 12B:
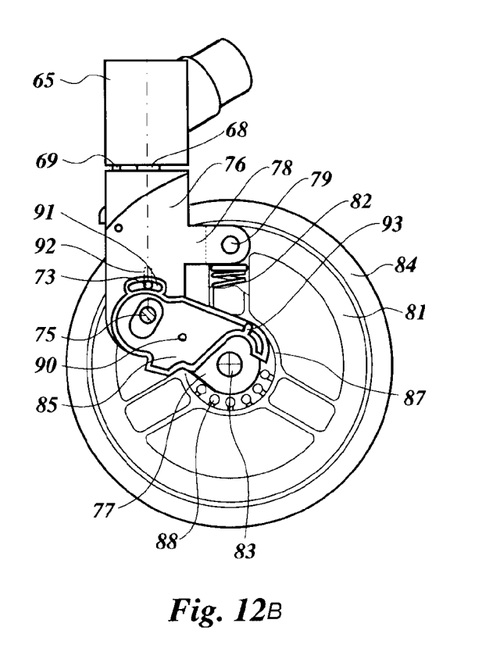

FIG. 12 shows in two views a wheel set 13,15 with a wheel 84 in side view with one of the wheels 84 removed so that the brake lever 85 can be seen in side view. FIG. 12a shows the situation whereby the wheel can rotate freely and FIG. 12b shows the situation whereby the brake control rod 73 is moved downwards by the slide piece 72 (see FIGS. 9 and 10) in the slot 92. The brake control rod 73 runs through an arcuate slot 91 of the brake lever 85 and by moving the brake control rod 73 downwards the brake lever 85 is pushed to rotate around pin 90. If this is possible, the brake nib 93 then moves upwards, is inserted between the brake notches 88 and so stops the rotation of the wheel. If the brake nib 93 cannot move upwards the brake control rod 73 will bend until the brake nib 93 can slip between two brake notches 88. The slot 91 through which the brake control rod 73 runs is arcuate so that the swivel arm 77 with the brake lever 85 can rotate around the swivel axis 75 and so follow the bumpiness in the pavement.

Figure 13A:
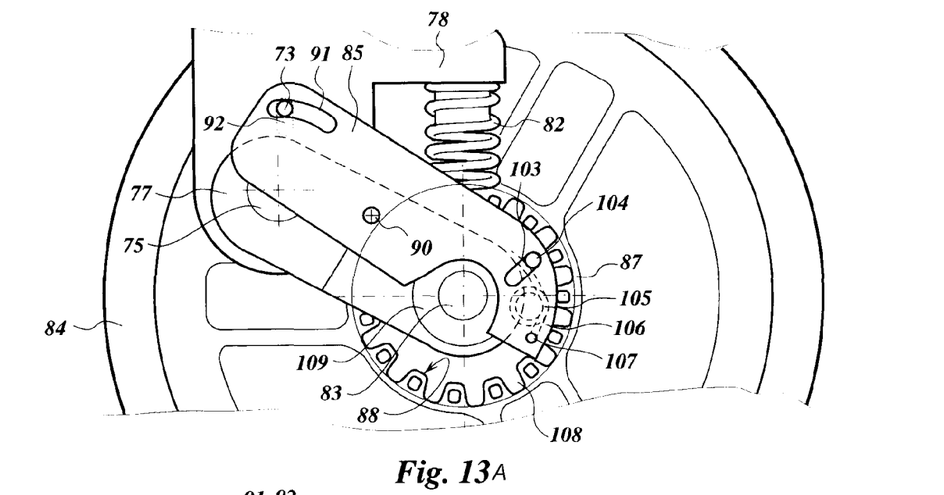
FIG. 13a shows a second embodiment of the wheel in side view whereby the wheels are free to rotate.
Figure 13B:
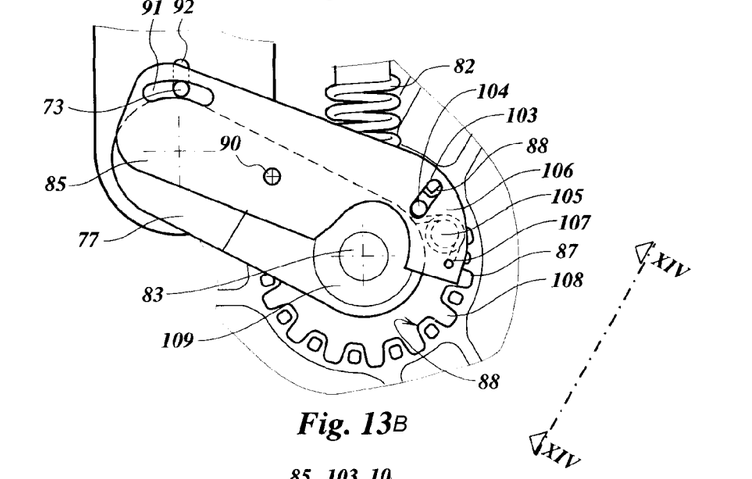
FIG. 13b shows a detail of the side view of the embodiment of FIG. 13a whereby the brake is activated.
Figure 13C:
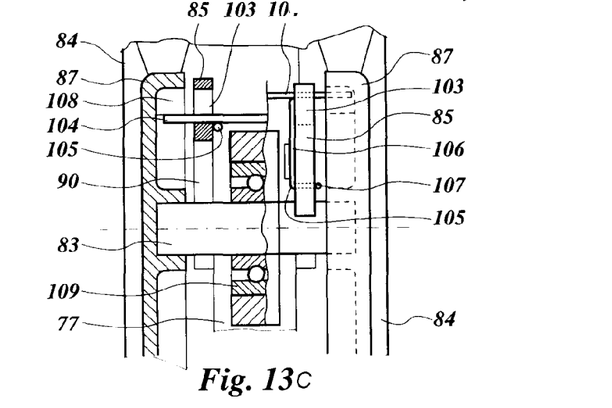
FIG. 13c shows a section and view XIV-XIV of a hub with a brake pin.

FIGS. 13a-13c show a further embodiment of the wheel sets. In this embodiment a bearing 109 is mounted in the swivel arm 77. The wheel axis 83 rotates in the bearing 109 and is fixed in the hub 87. The spring 82 is directly coupled to the spring bracket 78 and the swivel arm 77. The coupling between the brake lever 85 and the hub 87 is with a brake pin 104. The brake pin 104 extends through slots 103 in the brake lever 85 to within the hub 87. Each brake lever 85 has a spring 106 that is located in a holder 105 at the side and one end of the spring 106 extends through a hole 105. The spring 106 pushes the brake pin 104 towards the brake notches 88.

In FIG. 13a the brake control rod 73 is in its upward position in the slot 92 and the wheel 84 is not braked and the brake notches 88 can rotate past the brake pin 104. In FIG. 13b the brake control rod 73 has moved downwards in the slot 92 and the brake lever 85 rotates around pin 90. For braking the wheel 84, the brake pin 104 has to move between the brake notches 88 in a gap 108. As is shown in FIG. 13b and in FIG. 13c on the left side of the figure, a brake notch 88 sometimes prevents this. In that situation the brake pin 104 can move in the slot 103 so that no damage occurs. After the wheel 84 has rotated slightly the brake pin 104 slides into the gap 108 and rotation of the wheel 84 is stopped, see FIG. 13c on the right side.

What is claimed is:

1. Device for transporting a child in a child seat comprising a main frame for supporting the child seat, a swivable push bar for pushing the main frame from different sides, pivotable wheels or wheel sets for supporting the main frame whereby the wheels or wheel sets are provided with pivot locks and the device comprises a mechanism moved by the swivable push bar that activates the pivot locks of the wheels or wheel sets under the push bar and deactivates the pivot locks for the other wheels or wheel sets characterized in that the push bar comprises a brake handle that activates brakes in the wheels or wheel sets and that the wheels or wheel sets are designed such that the brake handle only activates brakes in the wheels or wheel sets with activated pivot locks.

2. Device in accordance with claim 1 whereby the push bar is coupled to a push bar axis swivellable in bearings mounted on the main frame, which push bar axis has cams activating cable pulling means connected to cables which actuate the pivot locks.

3. Device in accordance with claim 1 whereby the push bar is coupled with a slide to a push bar axis swivellable in bearings mounted on the main frame, which slide can be positioned along the length of the push bar for changing its longest distance from the push bar axis.

4. Device in accordance with claim 3 whereby the push bar is U-shaped and at both ends connected by the slides to the push bar axis.

5. Device in accordance with claim 4 whereby the horizontal axes of the wheels or wheel sets are mounted in a spring arm that can resiliently move relative to the main frame against a spring.

6. Device in accordance with claim 5 whereby the spring arm has a brake lever for activating a brake, which brake lever has a arc shaped cam surface on which a cable activated pin can push for activating the brake.

7. Device in accordance with claim 6 whereby the rotation of a wheel can be stopped by moving a brake lever coupled to a brake pin so that the brake pin is pushed between brake notches on the inside of the hub of the wheel and whereby the brake pin can move against a spring in a slot in the brake lever when the brake pin is pushed against a brake notch.

8. Device for transporting a child in a child seat comprising a main frame for supporting the child seat, a swivable push bar for pushing the main frame from different sides, pivotable wheels or wheel sets for supporting the main frame whereby the wheels or wheel sets are provided with pivot locks adapted for locking the pivoting around a vertical axis and with brakes adapted for locking the rotation of the wheel or wheels around a horizontal axis whereby the device comprises a mechanism moved by the swivable push bar that activates the pivot locks of the wheels or wheel sets under the push bar and deactivates the pivot locks for the other wheels or wheel sets characterized in that the push bar comprises a brake handle adapted for activating the brakes in the wheels or wheel sets and that the wheels or wheel sets are designed such that the brake handle only activates the wheels or wheel sets with activated pivot locks.

9. Device in accordance with claim 8 whereby the push bar is coupled to a push bar axis swivellable in bearings mounted on the main frame, which push bar axis has cams activating cable pulling means connected to cables which actuate the pivot locks.

10. Device in accordance with claim 8 whereby the push bar is coupled with a slide to a push bar axis swivellable in bearings mounted on the main frame, which slide can be positioned along the length of the push bar for changing its longest distance from the push bar axis.

* * * * *